US010019983B2

United States Patent
Ganapathiraju et al.

(10) Patent No.: US 10,019,983 B2
(45) Date of Patent: Jul. 10, 2018

(54) METHOD AND SYSTEM FOR PREDICTING SPEECH RECOGNITION PERFORMANCE USING ACCURACY SCORES

(76) Inventors: Aravind Ganapathiraju, Hyderabad (IN); Yingyi Tan, Carmel, IN (US); Felix Immanuel Wyss, Bloomington, IN (US); Scott Allen Randal, Redmond, WA (US)

(*) Notice: Subject to any disclaimer, the term of this patent is extended or adjusted under 35 U.S.C. 154(b) by 317 days.

(21) Appl. No.: 13/599,297

(22) Filed: Aug. 30, 2012

(65) Prior Publication Data

US 2014/0067391 A1    Mar. 6, 2014

(51) Int. Cl.
| | | |
|---|---|---|
| G10L 15/00 | (2013.01) | |
| G10L 15/01 | (2013.01) | |
| G10L 15/26 | (2006.01) | |
| G10L 15/08 | (2006.01) | |

(52) U.S. Cl.
CPC ........ G10L 15/01 (2013.01); *G10L 2015/088* (2013.01)

(58) Field of Classification Search
None
See application file for complete search history.

(56) References Cited

U.S. PATENT DOCUMENTS

| | | | | |
|---|---|---|---|---|
| 5,842,163 A | * | 11/1998 | Weintraub | G10L 15/10 704/231 |
| 5,848,384 A | | 12/1998 | Hollier et al. | |
| 6,505,155 B1 | | 1/2003 | Vanbuskirk et al. | |
| 6,594,630 B1 | * | 7/2003 | Zlokarnik | G10L 15/26 704/241 |
| 6,996,525 B2 | | 2/2006 | Bennett et al. | |
| 7,499,895 B2 | * | 3/2009 | Kondo | G06T 1/00 706/15 |
| 7,844,456 B2 | | 9/2010 | Cai et al. | |
| 7,917,363 B2 | | 3/2011 | Starkie | |
| 2001/0044727 A1 | * | 11/2001 | Nakatoh | H04B 1/665 704/500 |

(Continued)

FOREIGN PATENT DOCUMENTS

| | | |
|---|---|---|
| JP | 2005-017603 | 1/2005 |
| JP | 2007-199173 | 8/2007 |

OTHER PUBLICATIONS

Yoichi Yamashita "Prediction of Keyword Spotting Accuracy Based on Simulation" Department of Computer Science, Ritsumeikan University.*

(Continued)

*Primary Examiner* — Paras D Shah
*Assistant Examiner* — Thuykhanh Le (57) ABSTRACT

A system and method are presented for predicting speech recognition performance using accuracy scores in speech recognition systems within the speech analytics field. A keyword set is selected. Figure of Merit (FOM) is computed for the keyword set. Relevant features that describe the word individually and in relation to other words in the language are computed. A mapping from these features to FOM is learned. This mapping can be generalized via a suitable machine learning algorithm and be used to predict FOM for a new keyword. In at least one embodiment, the predicted FOM may be used to adjust internals of speech recognition engine to achieve a consistent behavior for all inputs for various settings of confidence values.

17 Claims, 8 Drawing Sheets

(56) References Cited

U.S. PATENT DOCUMENTS

| | | | |
|---|---|---|---|
| 2002/0013706 A1 | 1/2002 | Profio | |
| 2002/0116197 A1* | 8/2002 | Erten | G06K 9/6292 704/273 |
| 2003/0069729 A1 | 4/2003 | Bickley et al. | |
| 2004/0015350 A1 | 1/2004 | Gandhi et al. | |
| 2004/0162730 A1* | 8/2004 | Mahajan | G10L 15/197 704/260 |
| 2006/0149558 A1 | 7/2006 | Kahn et al. | |
| 2006/0173678 A1 | 8/2006 | Gilbert et al. | |
| 2006/0178886 A1* | 8/2006 | Braho | G10L 15/065 704/246 |
| 2007/0073748 A1* | 3/2007 | Barney | G06F 17/30675 |
| 2007/0136058 A1* | 6/2007 | Jeong | G10L 15/08 704/240 |
| 2007/0239453 A1* | 10/2007 | Paek | G10L 15/065 704/257 |
| 2008/0059191 A1* | 3/2008 | Huang | G10L 15/30 704/260 |
| 2008/0147399 A1* | 6/2008 | Jaiswal | G10L 15/08 704/251 |
| 2008/0195387 A1* | 8/2008 | Zigel | G10L 17/06 704/236 |
| 2008/0294441 A1* | 11/2008 | Saffer | G10L 15/08 704/255 |
| 2009/0123083 A1* | 5/2009 | Kawase | G06T 3/4007 382/254 |
| 2009/0187402 A1* | 7/2009 | Scholl | G10L 15/01 704/233 |
| 2009/0292538 A1 | 11/2009 | Barnish | |
| 2009/0292541 A1* | 11/2009 | Daya | G10L 15/063 704/251 |
| 2010/0179811 A1* | 7/2010 | Gupta | G10L 15/22 704/235 |
| 2012/0035887 A1* | 2/2012 | Augenbraun | G06T 15/06 703/1 |
| 2013/0060571 A1* | 3/2013 | Soemo | G10L 15/30 704/251 |
| 2013/0158999 A1* | 6/2013 | Maruta | G01C 21/3608 704/252 |
| 2013/0262106 A1* | 10/2013 | Hurvitz | G10L 15/183 704/235 |

OTHER PUBLICATIONS

Yoichi Yamashita ("Prediction of Keyword Spotting Accuracy based on Simulation" 6th European Conference on Speech Communication and Technology, Hungary, Sep. 5-9, 1999).*

International Search Report for International Application No. PCT/US 12/53061 (Filing date Aug. 30, 2012) dated Nov. 19, 2012.

First Examination Report issued in related New Zealand Application #705071 (International Application No. PCT/US12/53061 (Filing date Aug. 30, 2012)) dated Jan. 27, 2016.

Extended European Search Report issued in related European Application #12 88 3743 (International Application No. PCT/US 12/53061 (Filing date Aug. 30, 2012, dated Jun. 14, 2016.

Yamashita Y ED—European Speech Communication Association: "Prediction of Keyword Spotting Accuracy Based on Simulation", 6th European Conference on Speech Communication and Technology. Eurospeech '99. Budapest, Hungary, Sep. 5-9, 1999; Eurospeech, Bonn: ESCA, DE, Sep. 5, 1999, pp. 1235-1238, XP001075903.

Japanese Patent Office Translation of Notice of Rejection in related foreign patent application 2015-529768 (PCT application PCT/US12/53061, international filed Aug. 30, 2012), report dated report Jul. 26, 2016, translation dated Aug. 1, 2016.

Yoichi Yamashita, Prediction of Keyword Spotting Accuracy Based on Simulation, Proc of 6th European Conference on Speech Communication and Technology (Eurospeech '99), Sep. 3, 1999, pp. 1235-1238, URL, http://www.slp.is.ritsumei.ac.jp/~yama/pubs/euro99.pdf.

New Zealand Patent Office Further Examination Report in related foreign patent application 2015-529768 (PCT application PCT/US12/53061, international filing date Aug. 30, 2012), report dated Jul. 21, 2016.

Supplementary Partial European Search Report issued in related European Application #12 88 3743 (International Application No. PCT/US 12/53061 (Filing date Aug. 30, 2012)) dated Feb. 11, 2016.

European Patent Office Action for Application No. 12 883 743.2, dated Jan. 3, 2018, 6 pages.

Australian Government IP Australia Examination Report No. 1 for Application No. 2012388796, dated Mar. 23, 2018, 3 pages.

Canada Intellectual Property Office Action for Application No. 2,883,076, dated Mar. 21, 2018, 4 pages.

* cited by examiner

| | Field | Example 800a | Example 800b |
|---|---|---|---|
| 805 | Keyword | debug | interactive |
| 810 | Predicted Fom | 29.6971 | 78.5823 |
| 815 | Num of Phonemes | 5 | 8 |
| 820 | Num of Stressed Vowels | 1 | 2 |
| 825 | Num of Syllables | 2 | 4 |
| 830 | Duration Mean | 36.6176 | 61.9474 |
| 835 | Duration Std | 8.96752 | 10.5293 |
| 840 | Partial Dictionary Words | 33.3333 | 50 |
| 845 | Similar Dictionary Words | 5 | 33.3333 |
| 850 | Similar Prefix | 20 | 100 |
| 855 | Similar Suffix | 25 | 100 |
| 860 | Confusion Index | 38.85 | 61.65 |

| | Feature Name | i | a | b |
|---|---|---|---|---|
| 905 | Feature Name | i | a | b |
| 910 | Number of Phonemes Polynomial | 1 | 0.1499 | -32.2629 |
| 915 | Number of Stressed Vowels Polynomial | 2 | -0.103 | -43.7428 |
| 920 | Number of Syllables Polynomial | 3 | -1.8653 | -4.5193 |
| 925 | Duration Mean Polynomial | 4 | 0.003 | 189.0637 |
| 930 | Duration Std Polynomial | 5 | -1.2043 | -8.0623 |
| 935 | Partial Dictionary Words Polynomial | 6 | -0.0001 | -1178.01 |
| 940 | Similar Dictionary Words Polynomial | 7 | 0.0026 | -62.6559 |
| 945 | Similar Prefix Polynomial | 8 | 0.0001 | 459.7279 |
| 950 | Similar Suffix Polynomial | 9 | 0.0001 | 425.4597 |
| 955 | Confusion Index Polynomial | 10 | 0.0008 | 199.8127 |

Fig. 9

METHOD AND SYSTEM FOR PREDICTING SPEECH RECOGNITION PERFORMANCE USING ACCURACY SCORES

BACKGROUND

The present invention generally relates to telecommunication systems and methods, as well as automatic speech recognition systems. More particularly, the present invention pertains to machine learning within automatic speech recognition systems.

It is known in the art that speech recognition may be performed by measuring a system's ability to recognize a target word by analyzing its audio file with reference to another audio file(s) of a set of words. The target word may then be separated from the set of words if it does not meet a certain recognition threshold. By separating below-threshold target words from the set of words, the set may be restricted to readily-identified words. The words can thus be used in a speech recognition application with a certain degree of confidence. However this process can be time-consuming, and impractical in many applications. Having a system that can predict recognition accuracy of a target word, without the need for processing a large set of audio files to measure recognition rate, enables a user to understand how the system will perform in the real world without having to wait for a full deployment, thus saving money, effort, and resources.

SUMMARY

A system and method are presented for predicting speech recognition performance using accuracy scores in speech recognition systems within the speech analytics field. The same keyword set is used throughout. Figure of Merit (FOM) is a measure used to describe accuracy of speech recognition systems and keyword spotting systems in particular. It is defined as the detection rate for an average of 5 false alarms per keyword per hour (FA/KW/Hr). In at least one embodiment, FOM is predicted through an algorithm which is discussed in greater detail below. The FOM uses several features of a keyword in order to predict the accuracy with which a system can determine a word match. For each keyword within the set, the keyword spotter is run on a large body of recorded speech to determine the FOM. Relevant features that describe the word individually and in relation to other words in the language are computed. A mapping from these features to FOM is learned. This mapping can then be generalized via a suitable machine learning algorithm and be used to predict FOM for a new keyword. The predicted FOM may be used to adjust internals of speech recognition engine to achieve a consistent behavior for all inputs for various settings of confidence values.

In one embodiment, a computer-implemented method for predicting speech recognition performance is disclosed, comprising the steps of: accepting an input; computing at least one feature vector for said input; inputting said at least one feature vector into a prediction model; and obtaining a prediction for the input from the prediction model.

In another embodiment a system for predicting speech recognition performance is disclosed, comprising: means for accepting an input; means for computing at least one feature vector for said user input; means for inputting said at least one feature vector into a prediction model; and means for obtaining a prediction of figure of merit for the input from the prediction model.

In another embodiment a computer-implemented method for using predicted speech recognition performance to adjust internal scores of a speech recognition engine is disclosed, the method comprising the steps of: accepting an input; computing at least one feature vector for said input; inputting said at least one feature vector into a prediction model; obtaining a prediction for figure of merit for the keyword; and adjusting a mapping of said internal scores to confidence values based on said prediction.

DETAILED DESCRIPTION

For the purposes of promoting an understanding of the principles of the invention, reference will now be made to the embodiment illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates.

Automatic speech recognition (ASR) systems analyze human speech and translate the speech into text or words. Performance of these systems is commonly evaluated based on the accuracy, reliability, language support, and the speed with which speech can be recognized. The performance of the system is expected to be very high. Superior performance is often quantified by a high detection rate and a low false alarm rate. Industry standard is considered to be around a 70% detection rate at 5 false alarms per keyword per hour of speech, or 5 FA/KW/Hr. This may be read as an FOM of 70. Factors such as accent, articulation, speech rate, pronunciation, background noise, etc., can have a negative effect on the accuracy of the system. Processing speed is necessary to analyze hundreds of telephone conversations at once and in real-time. The system is also expected to perform consistently and reliably irrespective of channel conditions and various artifacts introduced by modern telephony channels, especially VoIP. Keywords from multiple languages also need to be spotted on the same audio source.

Machine learning may be used to predict the performance of an engine on a particular keyword. Supervised learning may be referred to as the machine learning task of inferring a function from supervised, or labeled, training data. Such training data may consist of a set of training examples, which represent accuracy values for a large set of keywords. In supervised learning, each training example is a pair consisting of an input feature vector and a desired output accuracy value. A supervised learning algorithm analyzes the training data and produces an inferred function, or regression function. Such function should predict the correct output value for any valid input object. This requires the learning algorithm to generalize from the training data to unseen situations in a "reasonable" way. The regression function may be modeled using a variety of forms such as a simple straight line to a complex neural network.

Those skilled in the art will recognize from the present disclosure that the various methodologies disclosed herein may be computer implemented using a great many different forms of data processing equipment, such as digital microprocessors and associated memory executing appropriate software program(s), to name just one non-limiting example. The specific form of the hardware, firmware and software used to implement the presently disclosed embodiments is not critical to the present invention.

A method and system is defined for predicting speech recognition performance using accuracy scores. The same keyword set is used throughout. FOM is computed for each keyword in the keyword set. A FOM is determined through an algorithm which is discussed in greater detail below. The FOM uses several features in order to predict the accuracy with within a system can determine a word match. For each keyword within the set, the keyword spotter is run on a large body of recorded speech to determine the FOM. Relevant features that describe the word individually and in relation to other words in the language are computed. A mapping from these features to FOM is learned. This mapping can then be generalized via a suitable machine learning algorithm and be used to predict FOM for a new keyword.

Figure 1:
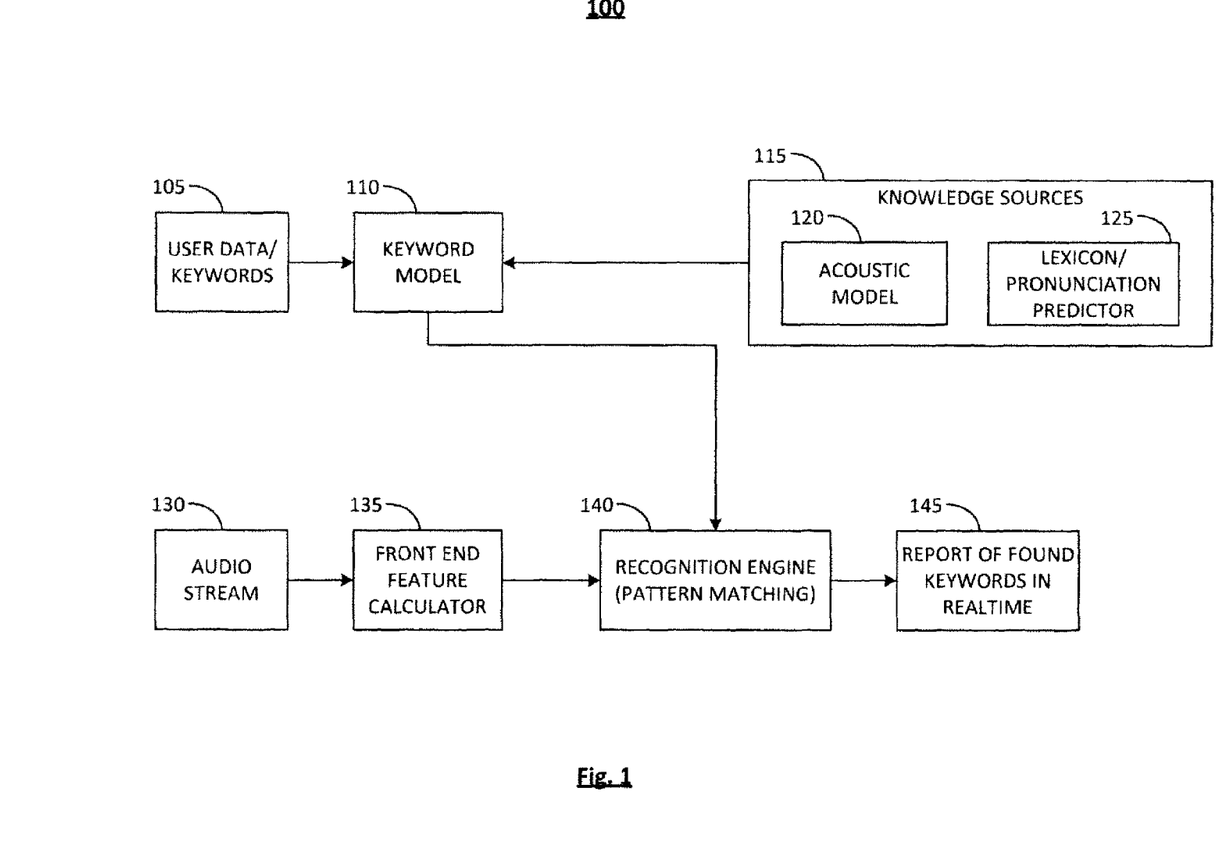
FIG. 1 is a diagram illustrating an exemplary system for keyword spotting.

FIG. 1 is a diagram illustrating an exemplary system for keyword spotting, 100. The basic components of a keyword spotter 100 may include: User Data/Keywords 105; Keyword Model 110; Knowledge Sources 115, which may include an Acoustic Model 120 and a Lexicon/Pronunciation Predictor 125; an Audio Stream 130; a Front End Feature Calculator 135; a Recognition Engine (Pattern Matching) 140; and the Report of Found Keywords in Real-Time 145.

Keywords 105 may be defined by the user of the system according to user preference. The Keyword Model 110 may be formed by concatenating phoneme hidden Markov models (HMMs) or any other statistical representation of lexical units that comprise a word. The Keyword Model 110 may be composed based on the keywords that are defined by the user and the input to the Keyword Model 110 based on Knowledge Sources 115. Such Knowledge Sources may include an Acoustic Model 120 and a Lexicon/Pronunciation Predictor 125.

The Knowledge Sources 115 may store probabilistic models of relations between pronunciations and acoustic events. The Knowledge Sources 115 may be developed by analyzing large quantities of audio data. The Acoustic Model 120 and the Lexicon/Pronunciation Predictor 125 are made, for example, by looking at a word like "hello" and examining the phonemes that comprise the word. Every keyword in the system is represented by a statistical model of its constituent sub-word units called the phonemes. The phonemes for "hello" as defined in a standard phoneme dictionary are: "hh", "eh", "l", and "ow". Models of the four phonemes are then strung together into one composite model which then becomes the keyword model for the world "hello". These models are language dependent. In order to also provide multi-lingual support, multiple knowledge sources may be provided.

The Acoustic Model 120 may be formed by statistically modeling the various sounds that occur in a particular language. A phoneme is assumed to be the basic unit of sound. A predefined set of such phonemes is assumed to completely describe all sounds of a particular language. An HMM, which encodes the relationship of the observed audio signal and the unobserved phonemes, forms the fundamental theory for most modern speech recognition systems. A phoneme is considered to be composed of three states, representing the beginning, central, and trailing portions of the sound. An HMM is constructed by concatenating these three states. A training process studies the statistical properties of each of these states for all of the phonemes over a large collection of transcribed audio. A relation between the textual properties and the spoken properties is thus formed. Typically, the statistics of states may be encoded using a Gaussian mixture model (GMM). A set of these GMMs is termed as an acoustic model. Specifically, the one described in this application is referred to as a context-independent, or monophone, model. Many other model types may also be used. For example, many modern speech recognition systems may utilize a more advanced acoustic model, which may be context-dependent and capture the complex variations created due to the position of phonemes in conversational speech. Each state of a phoneme is specialized to its left and right neighboring phonemes.

The Lexicon/Pronunciation Predictor, 125, may be responsible for decomposing a word into a sequence of phonemes. Keywords presented from the user may be in human readable form, such as grapheme/alphabets of a particular language. However, the pattern matching algorithm may rely on a sequence of phonemes which represent the pronunciation of the keyword. A Pronunciation Predictor may store a mapping between commonly spoken words and their pronunciations. Once the sequence of phonemes is obtained, the corresponding statistical model for each of the phonemes in the Acoustic Model 120 may be examined. A concatenation of these statistical models may be used to perform keyword spotting for the word of interest.

The Audio Stream (i.e., what is spoken into the system by the user) 130 may be fed into the Front End Feature Calculator, 135, which may convert the Audio Stream 130 into a representation of the audio stream, or a sequence of spectral features. Audio analysis may be performed by segmenting the audio signal as a sequence of short (typically 10 ms) windows and extracting spectral domain features.

The Keyword Model, 110, which may be formed by concatenating phoneme HMMs, and the features extracted from the Audio Stream, 135, may both then be fed into a Recognition Engine for pattern matching, 140. The task of the Recognition Engine 140 may be to take a set of keyword models and search through presented audio stream to find if the words were spoken. In the multidimensional space constructed by the feature calculator, a spoken word may become a sequence of spectral domain feature vectors forming a trajectory in the acoustic space. Keyword spotting may now simply become a problem of computing the probability of generating the trajectory given the keyword model. This operation may be achieved by using the well-known principle of dynamic programming, specifically the Viterbi algorithm, which aligns the keyword model to the best segment of the audio signal, and results in a match score. If the match score is significant, the keyword spotting algorithm infers that the keyword was spoken and reports a keyword spotted event.

The resulting keywords may then be reported in real-time, 145. The Report may be presented as a start and end time of the keyword in the Audio Stream 130 with a confidence value that the keyword was found. The primary confidence value may be a function of how the keyword is spoken. For example, in the case of multiple pronunciations of a single word, the keyword "tomato" may be spoken as "tuh-mah-tow" and "tuh-may-tow". The primary confidence value may be lower when the word is spoken in a less common pronunciation or when the word is not well enunciated. The specific variant of the pronunciation that is part of a particular recognition is also displayed in the report.

Figure 2:
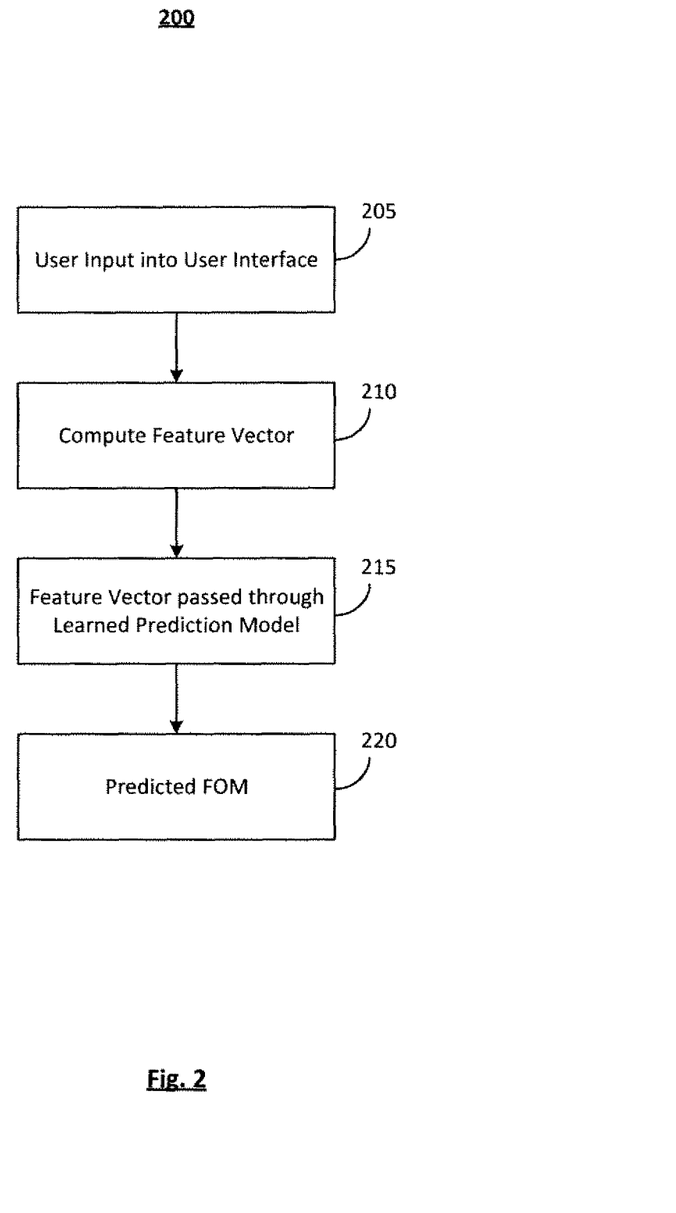
FIG. 2 is a flowchart illustrating a process for FOM prediction.

As illustrated in FIG. 2, a process 200 for FOM prediction is provided. The process 200 may be operative on any or all elements of the system 100 (FIG. 1).

Input is entered into a User Interface in step 205. User input may be in the form of words or phonetic pronunciation. A User Interface is described in greater detail in FIG. 3 as follows. Control is passed to operation 210 and the process 200 continues.

In step 210, the feature vector is computed for the user input. The feature vector may include such features as the number of phonemes, the number of syllables and the number of stressed vowels. Control is passed to operation 215 and the process 200 continues.

Figure 5:
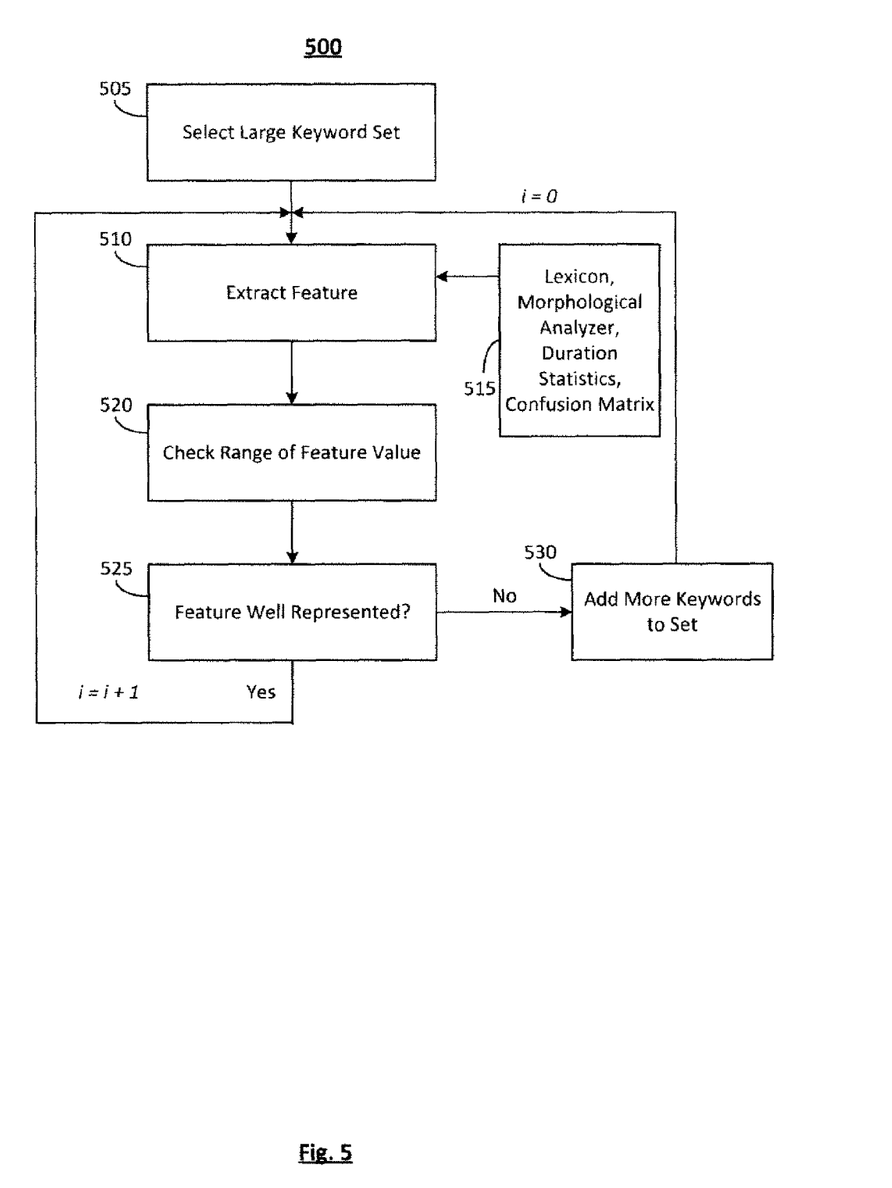
FIG. 5 is a flowchart illustrating a process for choosing the training keyword set.

In operation 215, the feature vector is passed through the learned prediction model. A learned prediction model for FOM may be created using a phoneme recognizer, a lexicon, a morphological analyzer, duration statistics, and a keyword set containing, for example, 500 keywords. The lexicon may be a lookup or predictive module that can convert input words into a sequence of constituent phonemes. The morphological analyzer may be another lookup or predictive module that contains entries for encoding the rules of morphology in a language. Common affixes in a language are used. For example, common affixes in the English language may include: "ment", "ing", "tion", and "non". The phoneme confusion matrix may be computed through the creation of a phoneme recognizer. The matrix quantitatively describes how the speech engine typically confuses sounds in the language. This matrix may later be used as the source for computing distances between words. With the creation of the matrix, it is possible to determine how the speech engine sees the phonetic space, but not necessarily what the theory of phonology expects the confusability to be. Duration statistics for phonemes are based on the analysis of phonemes on a large speech corpus using the phoneme recognizer created. The 500 word keyword set is carefully chosen to span the range of values that the modeling features can take. FIG. 5 below describes the process for choosing the keyword set in greater detail.

In operation 220, the predicted FOM is obtained and the process ends. For example, the result may be a FOM number output with a range of 0-100. A value approaching or equal to 0 may indicate low accuracy or high false alarm rate while a value approaching or equal to 100 may indicate high accuracy or confidence.

Operations 205, 210 and 215 may be performed interactively in real-time as a user adds more input.

Figure 3:
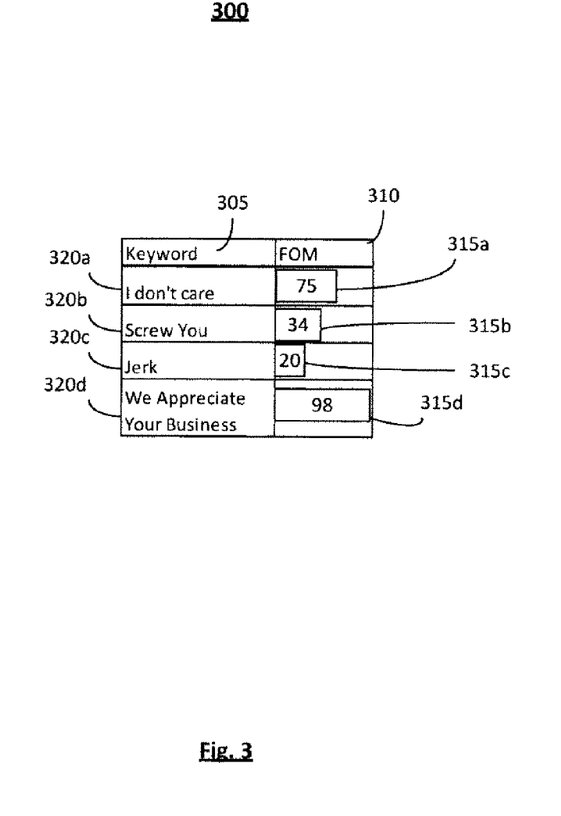
FIG. 3 is an illustration of a user interface.

FIG. 3 is an illustration of an example Guided User Interface 300 that may be used for data input in Process 200. The User Interface 300 may contain: a Keyword field 305 and a FOM field 310, FOM bars 315, and Keyword examples 320. Short words may have lower FOM and possibly higher false alarm rates. Longer words may have higher FOM. A keyword such as "Jerk" 320c may be more prone to error than the keyword "Screw You" 320b because the keyword "Jerk" is used in many other contexts and has a short acoustic context to help disambiguation. For example, "jerk" may sound similar to the parts of "manager", "integer", or "German". Conversely, "screw" is a pretty distinctive sound and is easily recognized. The length of the bar 315 is indicative of the degree of FOM for each keyword 305. For example, the keyword "We Appreciate Your Business" 320d has a bar length of 98, 315d. This may indicate that there is a higher predicted FOM for "We Appreciate Your Business" than a word such as "Jerk" 320c with a FOM bar length of 20, 315c. In at least one embodiment, the color of the bar may change based on the predicted FOM in order to provide more visual feedback.

Figure 4:
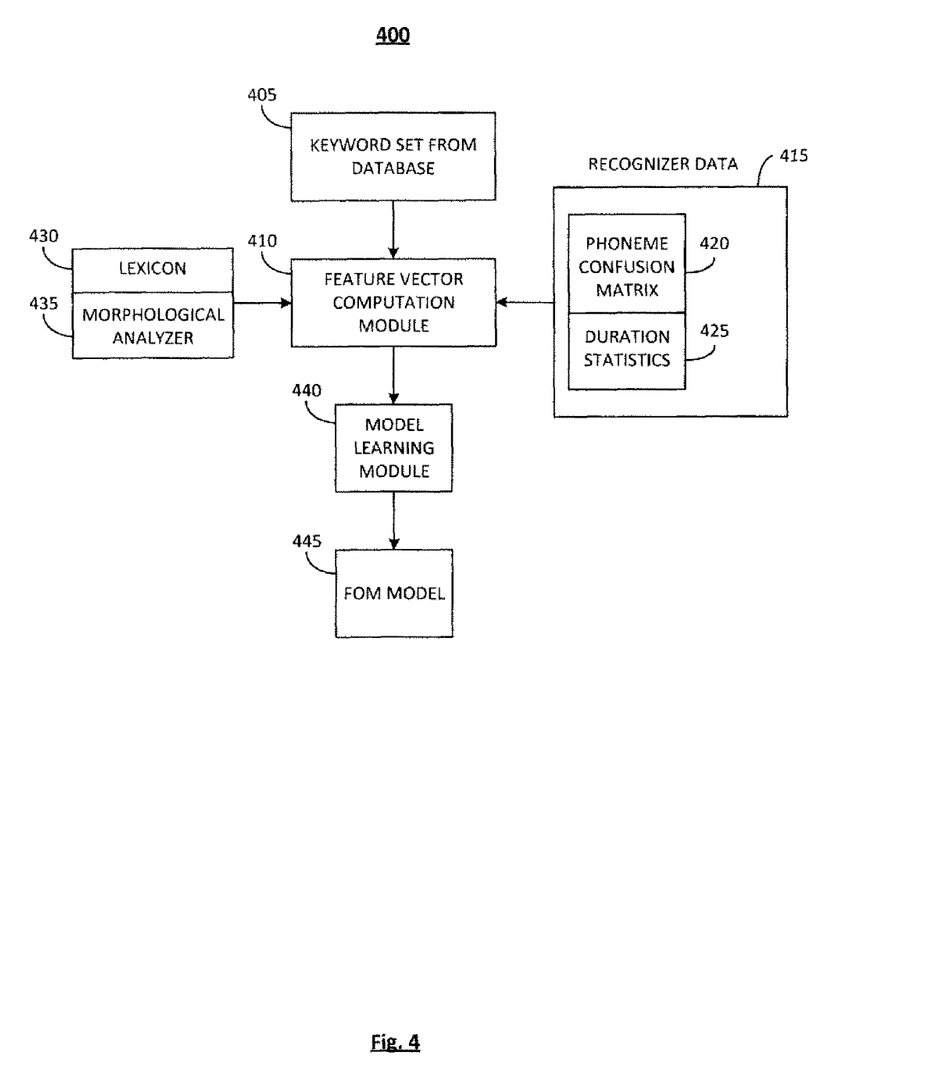
FIG. 4 is a flowchart illustrating a system for model learning.

As illustrated in FIG. 4, one embodiment of a system for model learning is provided and indicated generally at 400. The system 400 may be operative on any or all elements of the system 100 (FIG. 1). The basic components of the system 400 may include: a Keyword Set from the database 405; a Feature Vector Computation Module 410; Recognizer Data 415, which may consist of a Phoneme Confusion Matrix 420, and Duration Statistics 425; a Lexicon 430 and a Morphological Analyzer 435; a Model Learning Module 440; and an FOM Model 445.

The Keyword Set from the database 405 may be comprised of words for which sufficient audio recordings exist to compute statistically significant accuracy numbers. The Keyword Set may be comprised of 500 keywords, for example, that are fed into the Feature Vector Computation Module 410.

The Feature Vector Computation Module 410 may utilize data input from the Recognizer, which may consist of a Phoneme Confusion Matrix 420 and Duration Statistics 425, and from the Lexicon 430 and Morphological Analyzer 435, to determine the feature vector of the each keyword.

The Recognizer Data 415 is provided by the Recognition Engine 140 (FIG. 1) and is from the recognizer output. These data may include a Phoneme Confusion Matrix 420 and Duration Statistics 425. The Phoneme Confusion Matrix 420 is computed through the creation of a phoneme recognizer. The matrix quantitatively describes how the speech engine typically confuses sounds in the language. The Duration Statistics 425 may be based on the analysis of phonemes on a large speech corpus using the phoneme recognizer created.

The Lexicon 430 and Morphological Analyzer 435 are language dependent. The Lexicon 430 may comprise a lookup or predictive module that can convert input words into a sequence of constituent phonemes. The Morphological Analyzer 435 is also another lookup or predictive module that may contain entries for the most common prefixes and suffixes in a language.

The Model Learning Module 440 may use the output from the Feature Vector Computation Module 410 to infer a regression function from the data. The module may also adjust parameters to optimize a cost function, which in at least one embodiment is the minimization of the absolute value of the prediction error.

The FOM Model 445 may comprise the result of the model learning module 440 output which is saved by the system for use at runtime to predict the FOM on user input words. This is described in greater detail in FIG. 7 as follows.

Referring now to FIG. 5, one embodiment of a process 500 for choosing the training keyword set as used in step 405 of FIG. 4 is illustrated. In at least one embodiment, this forms a key part of the learning process as a well-chosen keyword set helps the learned model generalize well to words not seen during the supervised learning process.

A large keyword set is selected in step 505. For example, a keyword set containing a large number of words (e.g., 200 words in one embodiment) is chosen by examining the values of similar dictionary words and ascertaining that words cover the range of acceptable values for this feature. For example low, medium, and high values should be represented in this keyword set. Control is passed to operation 510 and the process 500 continues.

In operation 510, a feature is extracted. As previously described, feature vectors may include such features as the number of phonemes, number of syllables, number of stressed vowels, etc. This information may be derived from the Lexicon, Morphological Analyzer, Duration Statistics and Confusion Matrix 515. Control is passed to operation 520 and the process 500 continues.

In operation 520, the range of the feature value is checked. The range of values for each feature may vary and thus, values are examined to determine if they are lower, medium, or higher values.

As stated above, the keyword set is carefully chosen to span the range of values that the modeling features can take. Therefore, in operation 525, it is determined whether or not the feature is well represented within the key word set. If it is determined that the feature is well represented, then control is passed to step 510 and process 500 continues. If it is determined that the feature is not well represented, then the system control is passed to step 530 and process 500 continues.

The determination in operation 525 may be made based on any suitable criteria. For example, if the range of the feature value is too high or too low, unsuitable words may have been chosen in the keyword set. A keyword set with words that are too similar will have a skewed range. Where control is passed to step 510, in the FOM algorithm later described herein, the value of i is set equal to i+1, which is indicative of the next feature.

In operation 530, the number of keywords may be adjusted by adding more keywords to the set. In the FOM algorithm later described herein, the value of i is set equal to 0 which is indicative of the first feature. Control is passed operation 510 and the process 500 continues.

Figure 6:
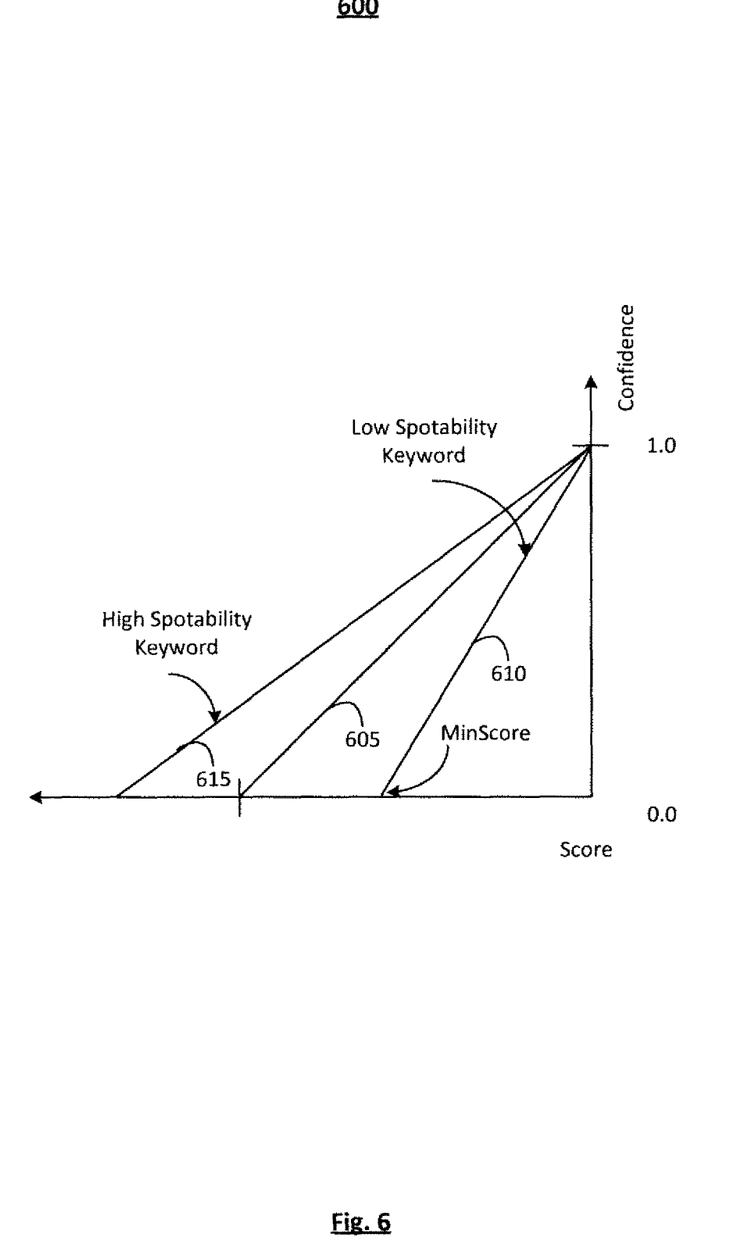
FIG. 6 is a diagram illustrating the relation between the internal match "Score" and external "Confidence" values.

In at least one embodiment, this measure is used to guide users in determining a good set of keywords. Other uses may include feedback to the recognition engine and controlling the false alarm rate. The diagram in FIG. 6 exhibits the relationship between the match probability, or the "score", as determined by the recognition engine and the confidence values as reported by the system. By default, the curve 605 may be used if no information about the keyword is known. If FOM is known, the relationship may be modified by changing the operating score range of the keyword, as illustrated by lines 610 and 615. The line 610 exhibits a low FOM keyword while the line 615 exhibits a high FOM keyword. As the value of the score increases, so does the confidence in the match where 0.0 may be indicative of highly confident match and a large negative value could indicate very low confidence in the match, for example. As the Score becomes more negative, likelihood of a mismatch increases. For example, as the Score approaches 0.0, there is a greater likelihood of a match. Thus, a Score of 0 and a Confidence of 1.0 would indicate a perfect match in this illustration. In at least one embodiment, it is desired to change the score range such that a chosen confidence value represents a similar score value for words with either low or high FOM.

Figure 7:
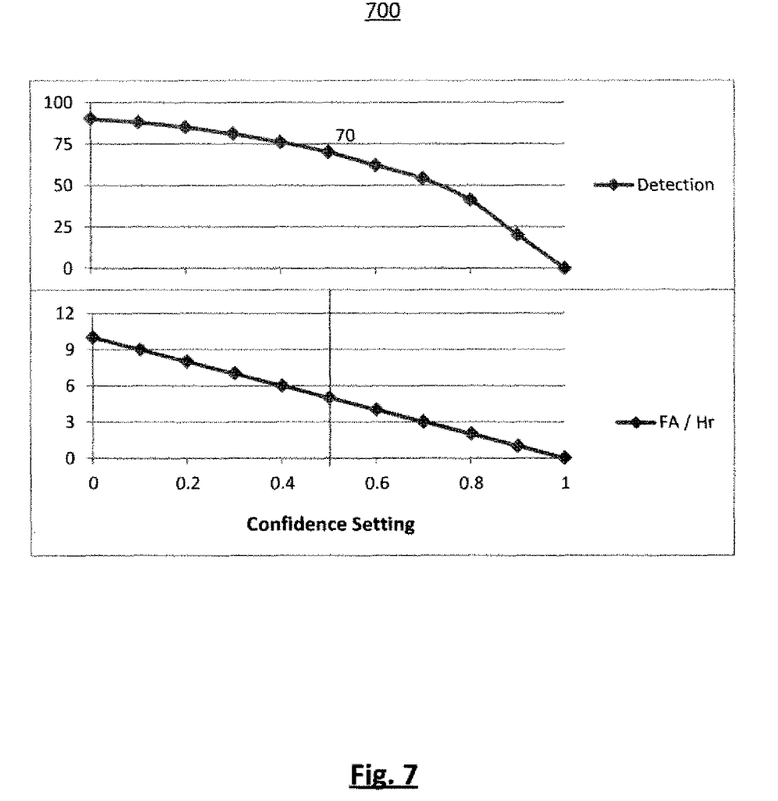
FIG. 7 is an illustration of FOM in relation to detection accuracy and false alarms per hour of speech

FIG. 7 is a diagram illustrating the system behavior with varied confidence settings. The result of changing the operating range based on FOM may be a more controlled behavior of the system. For example, when a user registers a keyword to be spotted, an associated FOM measure is presented, such as 70. By definition, this means the system results in 70% accuracy with a false alarm rate of 5 per hour. To obtain this behavior from the system, the internal score range is modified as shown in FIG. 7, such that at the default confidence setting (0.5) the system produces 5 false alarms per hour and a detection rate of 70%. If the user wishes a higher accuracy, the confidence setting may be lowered, which in turn could possibly create a higher false alarm rate. If the user wishes lower false alarm rate, confidence setting may be increased, thus possibly resulting in lower detection rate. By changing the internal score range based on FOM, this behavior becomes consistent for all words irrespective of their FOMs.

The diagram 700 illustrates the behavior of the system as the confidence settings are altered. For example, as the Confidence setting approaches 0.0, the rate of False Alarms (FA/Hr) increases and rate of detection increases as well. Conversely, as the Confidence setting approaches 1.0, the rate of false alarms decreases until it reaches a value 0.0 while the rate of detections also decreases and approaches 0.0.

Figure 8:
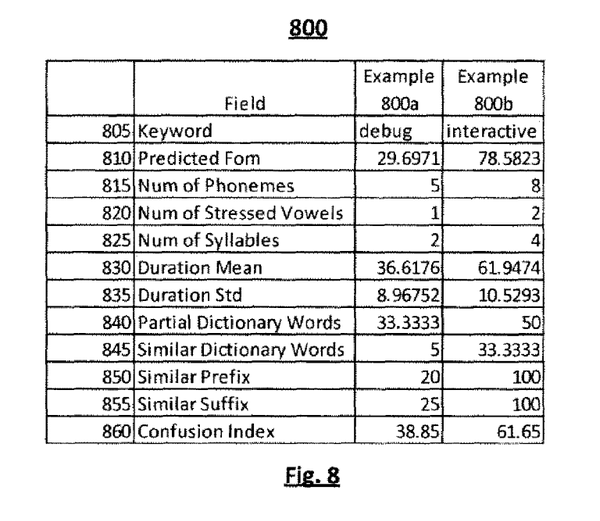
FIG. 8 is a table illustrating keyword examples.

FIG. 8 is a table illustrating keyword examples 800. Records 800a and 800b may contain a Keyword field 805, Predicted FOM field 810, Number of Phonemes field 815, Number of Stressed Vowels field 820, Number of Syllables field 825, Duration Mean field 830, Duration Standard Deviation field 835, Partial Dictionary Words field 840, Similar Dictionary Words field 845, Similar Prefix field 850, Similar Suffix field 855, and Confusion Index field 860.

The keyword field 805 may contain the keyword example. For example, Record 800a contains the word "debug" and Record 800b contains the word "interactive".

Figure 9:
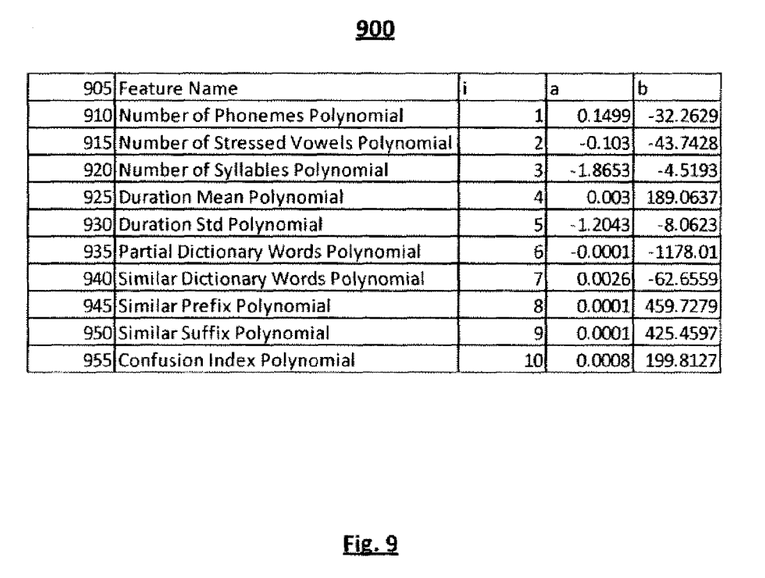
FIG. 9 is a table illustrating FOM model expression.

In at least one embodiment, the Predicted FOM field 810 contains the value predicted by the FOM expression equation:

$$fom = \sum_{i=1}^{N} a_i (x_i - b_i)^2$$

where i represents the index of features, x represents the i-th feature, and the equation parameters a and b are learned values, the values of which are exhibited in FIG. 9. N represents an upper limit on a number of features used to learn the prediction. For example, N=10 may be used.

For example, Record 800a contains a FOM value of 29.6971 for keyword 'debug' while Record 800b contains a FOM value of 78.5823 for keyword 'interactive'.

The Number of Stressed Vowels field 820 may exhibit the number of vowels in each keyword that emphasis is put on when the word is spoken. For example, the more vowels in a word that are stressed, the better enunciated they are and have higher accuracies in general. The keyword 'debug' contains 1 stressed vowel while 'interactive' contains 2 stressed vowels as illustrated in FIG. 8.

The Number of Syllables field 825 may contain the number of syllables within each keyword. For example, the keyword 'debug' has 2 syllables while the keyword 'interactive' contains 4 syllables.

The Duration Mean field 830 may contain the duration mean value from the feature. For example, the keyword 'debug' has a duration mean of 36.6276 while the keyword 'interactive' has a duration mean of 61.9474.

The Duration Standard Deviation field 835 may contain the standard deviation of the duration of the keyword. For example, the keyword 'debug' has a duration standard deviation value of 8.96752 while the keyword 'interactive' has a duration standard deviation value of 10.5293.

The Partial Dictionary Words field 840 may contain a measure of how many words in the typical vocabulary of the language of interest that the keyword is a part of. The higher this number, the fewer the number of words that the keyword is a part of which typically results in higher accuracy of a match. For example, the keyword 'debug' has a value of 33.3333 in the partial dictionary words field 840 while the keyword 'interactive' has a value of 50.

The Similar Dictionary Words field 845 may contain a measure of how many words in the typical vocabulary of the language of interest that the keyword is similar to. For example, the lower this number is, the more the number of words that the keyword is similar to and thus confusable with. A lower accuracy in general may result. Similarity is measured using a distance metric. An example of a distance metric can be seen with the words "cat" and "bat", which have the same number of phonemes. Broken down into phonemes, "cat" and "bat" become the following:

CAT->k ae t
BAT->b ae t

A comparison of the words shows that they have one phoneme that differs. A simple edit distance score of 1 results. The Confusion Matrix based edit distance could be 0.2 if the recognizer is confused between the sounds "k" and "b".

The words "cat" and "vacate" can be used as an example of words containing different numbers of phonemes. The words "cat" and "vacate" become:

CAT->* * k ae t
VACATE->v ey k ey t

If it is assumed that the insertion of a phoneme costs 1 and the distance between "ae" and "ey" is 0.3, then the total distance between the words is 2.3.

In another example, the distance between words that have errors can be shown below with the words "cat" and "aft":

CAT->k ae t *
AFT->* ae f t

Errors may include insertions, deletions, and substitutions of phonemes. If it is assumed that the insertion of a phoneme costs 1, deletion costs 2, and distance between phonemes "t" and "f" is 0.7, then the total distance from "cat" to "aft" is 3.7. This accounts for one insertion, one deletion, and one substitution of the phonemes.

In FIG. 8, for example, keyword 'debug' contains a value of 5 in the Similar Dictionary Words field 845 while the keyword 'interactive' contains a value of 33.3333.

The Similar Prefix field 850 may contain a measure of how many typical prefixes the keyword is confusable with. This number is provided by the morphological analyzer. A higher value in this field indicates less similarity with common prefixes and therefore higher typical accuracy for the word. A prefix is an affix which is placed before the root of a word. Examples are "pre" and "non". For example, the keyword 'debug' contains a Similar Prefix value of 20 while the keyword 'interactive' contains a Similar Prefix value of 100.

The Similar Suffix field 855 may contain a measure of how many typical suffixes the keyword may be confusable with. This number is provided by the morphological analyzer. A higher value in this field indicates less similarity with common prefixes and therefore higher typical accuracy for the word. In linguistics, a suffix (which also may be referred to as a postfix or ending) is an affix which is placed after the stem of a word. Two examples of suffixes are "tion" and "ous". As illustrated in FIG. 8, the keyword 'debug' contains a Similar Suffix value of 25 while the keyword 'interactive' contains a Similar Suffix value of 100.

The Confusion Index field 860 may contain a measure of the total sum of the confusability of the phonemes comprising the word. If a word is comprised of several often confused phonemes such as plosives and nasals, it is susceptible to having a lower accuracy. For example, the keyword 'debug' contains a Confusion Index value of 38.85 while the keyword 'interactive' contains a Confusion Index value of 61.65.

FIG. 9 is a table illustrating FOM model expression. This table illustrates examples of learned values through the previously described processes that may be used to compute the values described for records 800a and 800b in FIG. 8. These values are input into the FOM algorithm from above:

$$fom = \sum_{i=1}^{N} a_i(x_i - b_i)^2$$

FIG. 9 may contain the following fields: Feature Name 905, Number of Phonemes polynomial 910, Number of Stressed Vowels polynomial 915, Number of Syllables polynomial 920, Duration Mean polynomial 925, Duration Standard Deviation polynomial 930, Partial Dictionary Words polynomial 935, Similar Dictionary Words polynomial 940, Similar Prefix polynomial 945, Similar Suffix polynomial 950, and Confusion Index polynomial 955.

The feature name field contains the index of features heading as represented by i, and the equation parameters a and b. Fields 910 through 955 show the learned values for each field. For example, the Number of Phonemes polynomial 910 has values of i=1, a=0.1499, and b=-32.2629.

While the invention has been illustrated and described in detail in the drawings and foregoing description, the same is to be considered as illustrative and not restrictive in character, it being understood that only the preferred embodiment has been shown and described and that all equivalents, changes, and modifications that come within the spirit of the inventions as described herein and/or by the following claims are desired to be protected.

Hence, the proper scope of the present invention should be determined only by the broadest interpretation of the appended claims so as to encompass all such modifications as well as all relationships equivalent to those illustrated in the drawings and described in the specification.

The invention claimed is:

1. A method for predicting speech recognition performance in a speech recognition system, the system comprising a recognition engine, a database, a model learning module, and a performance prediction module, the method comprising the steps of:
   a. determining, by the performance prediction module, at least one feature vector for an input into the speech recognition system, wherein the at least one feature vector includes features that comprise at least two features selected from the group comprising: the number of phonemes, the number of syllables, and the number of stressed vowels;
   b. creating a prediction model by:
      i. selecting a set of keywords;
      ii. computing an other feature vector of desired features for each of the keywords;

iii. inputting the other feature vector into the model learning module, wherein the model learning module adjusts parameters to minimize a cost function; and
iv. saving the results from the model learning module as the prediction model for prediction of a figure of merit of the input;
c. passing the at least one feature vector into the prediction model;
d. applying, by the performance prediction module, the prediction model to predict a figure of merit for the speech recognition system, wherein the figure of merit is indicative of the accuracy of performance of the speech recognition system, wherein the figure of merit (fom) is predicted using a mathematical expression $$fom = \sum_{i=1}^{N} a_i(x_i - b_i)^2$$

N represents an upper limit on a number of features based on the determined feature vector used to learn the prediction, i represents the index of features, $x_i$ represents the i-th feature in the determined feature vector, and the equation parameters a and b are learned values;
e. reporting, by the performance prediction module, the predicted figure of merit for the speech recognition system performance; and
f. adjusting the recognition engine based on the predicted figure of merit.

2. The method of claim 1, wherein the figure of merit prediction has a detection rate averaging 5 FA/Kw/Hr.

3. The method of claim 1, wherein the input comprises at least one word.

4. The method of claim 1, wherein the input comprises a phonetic pronunciation.

5. The method of claim 1, wherein the method is performed in real-time as additional input is provided.

6. The method of claim 1, wherein the at least one feature vector is determined comprising the steps of:
converting the input into a sequence of phonemes; and
performing morphological analysis of words in a language.

7. The method of claim 6, wherein the converting is performed using statistics for phonemes and phoneme confusion matrix.

8. The method of claim 7, further comprising the step of computing the phoneme confusion matrix using a phoneme recognizer.

9. The method of claim 1, further comprising the step of automatically adjusting internal scores of the recognition engine based on the prediction reported by the performance prediction module.

10. A computer system with a digital microprocessor and associated memory configured for executing software programs, the system being configured for predicting speech recognition performance, comprising:
using a performance prediction module to determine at least one feature vector for an input into the speech recognition system, wherein the at least one feature vector includes features that comprise at least two features selected from the group comprising: the number of phonemes, the number of syllables, and the number of stressed vowels;
creating a prediction model by:
selecting a set of keywords;
computing an other feature vector of desired features for each of the keywords;
inputting the other feature vector into the model learning module, wherein the model learning module adjusts parameters to minimize a cost function; and
saving the results from the model learning module as the prediction model for prediction of a figure of merit of the input;
passing the at least one feature vector into the prediction model;
using the performance prediction module to apply the prediction model to predict a figure of merit for the speech recognition system, wherein the figure of merit is indicative of the accuracy of performance of the speech recognition system, wherein the figure of merit Om) is predicted using a mathematical expression $$fom = \sum_{i=1}^{N} a_i(x_i - b_i)^2$$

N represents an upper limit on a number of features based on the determined feature vector used to learn the prediction, i represents the index of features, $x_i$ represents the i-th feature in the determined feature vector, and the equation parameters a and b are learned values;
using the performance prediction module to report the predicted figure of merit for the speech recognition system performance; and
adjusting the recognition engine based on the predicted figure of merit.

11. The system of claim 10, wherein the figure of merit has a detection rate averaging 5 FA/Kw/Hr.

12. The system of claim 10, wherein the input comprises at least one word.

13. The system of claim 10, wherein the input comprises a phonetic pronunciation.

14. The system of claim 10, wherein the at least one feature vector is determined comprising:
a. converting the input into a sequence of phonemes; and
b. performing morphological analysis of words in a language.

15. The system of claim 14, wherein the converting is performed using statistics for phonemes and phoneme confusion matrix.

16. The system of claim 15, further comprising computing the phoneme confusion matrix using a phoneme recognizer.

17. The system of claim 10, further comprising automatically adjusting internal scores of the recognition engine based on the prediction reported by the performance prediction module.

* * * * *

UNITED STATES PATENT AND TRADEMARK OFFICE
CERTIFICATE OF CORRECTION

PATENT NO.       : 10,019,983 B2
APPLICATION NO.  : 13/599297
DATED            : July 10, 2018
INVENTOR(S)      : Aravind Ganapathiraju et al.

Page 1 of 1

It is certified that error appears in the above-identified patent and that said Letters Patent is hereby corrected as shown below:

In the Claims
Column 12, Line 23 (Approx.), Claim 10 delete "Om)" and insert -- (fom) --

Signed and Sealed this
Sixth Day of August, 2019

Andrei Iancu
*Director of the United States Patent and Trademark Office*